United States Patent [19]

Hirano et al.

[11] Patent Number: 4,728,870
[45] Date of Patent: Mar. 1, 1988

[54] WIPER CONTROL APPARATUS

[75] Inventors: Kazuo Hirano; Yukimitsu Hattori, both of Osaka; Haruhiro Muto, Mie, all of Japan

[73] Assignees: Sumitomo Electric Industries, Ltd., Osaka; Sumitomo Wiring Systems, Ltd., Yokkaichi, both of Japan

[21] Appl. No.: 46,709

[22] Filed: May 7, 1987

[30] Foreign Application Priority Data

May 8, 1986 [JP] Japan .............................. 61-69476[U]
May 8, 1986 [JP] Japan .............................. 61-69477[U]
Jun. 3, 1986 [JP] Japan .............................. 61-127174

[51] Int. Cl.⁴ .............................................. B60S 1/08
[52] U.S. Cl. .................................... 318/443; 318/484; 318/DIG. 2; 15/250.17
[58] Field of Search ............... 318/280, 281, 282, 283, 318/443, 444, 445, 452, 466, 467, 468, 484, DIG. 2; 15/250.16, 250.17

[56] References Cited

U.S. PATENT DOCUMENTS 4,422,024 12/1983 Itoh et al. ............................ 318/443
4,451,768 5/1984 Kohler et al. ....................... 318/443

FOREIGN PATENT DOCUMENTS 53-30541 3/1978 Japan .................................... 318/443

Primary Examiner—Bentsu Ro
Attorney, Agent, or Firm—Cushman, Darby & Cushman

[57] ABSTRACT

A wiper control apparatus includes a main relay switch for passing the voltage received from a power supply to make the wiper control apparatus operable, an ignition switch for passing the voltage from the power supply to make the vehicle operable, and control means for controlling the ON/OFF operation of the main relay switch. The control means operates in response to the conductive state of the ignition switch to render the main relay switch conductive. After a predetermined time in response to a cut-off state of the ignition switch, the control means renders the main relay switch nonconductive. The predetermined time allows the wiper blade to move down to a predetermined park position of a windshield after the ignition switch is turned off.

5 Claims, 9 Drawing Figures

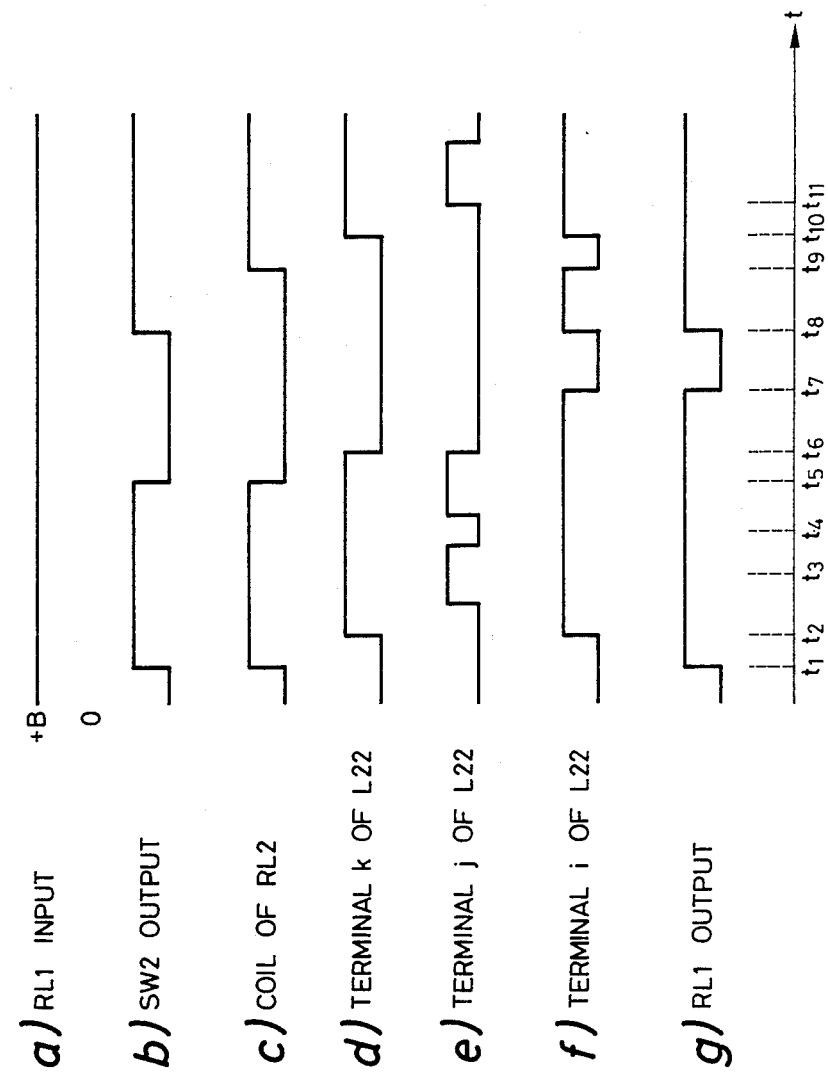

WIPER CONTROL APPARATUS

BACKGROUND OF THE INVENTION

1. Field of the Invention

The present invention relates to a wiper control apparatus for controlling the movement of a wiper blade of a wiper mounted on a motor vehicle and used to remove waterdrops sticking to the surface of its windshield.

2. Prior Art

FIG. 1 is a circuit diagram of a conventional wiper, wherein the wiper comprises a battery 10, an ignition switch 20, a wiper switch 30 and a wiper driving means 40.

The wiper switch 30 is set to an OFF position, a first closed position LO or a second closed position HI. In the OFF position, a stop terminal S and a first output terminal +1 are connected and, in the closed position LO, the first output terminal +1 and a battery terminal B are connected and, further in the closed position HI, a second output terminal +2 and the battery terminal B are connected.

The wiper driving means 40 has a wiper motor 41 and a cam switch 42. Of the aforesaid two components, the wiper motor 41 actuates the wiper on receiving power from the output terminals +1, +2 of the wiper switch 30 through lines $l_1$, $l_2$, whereas the cam switch 42 has a moving contact 42c connected to the stop terminal S through a voltage terminal 42a, a ground termrinal 42b and a line $l_4$. The moving contact 42c is switched to the ground terminal 42b while the wiper blade stays in the predetermined lower position of the windshield (outside the driver's ken) and to the voltage terminal 42a while the wiper blade stays in a position other than the aforesaid one.

On the other hand, the power is supplied from the battery 10 to the voltage terminal 42a through lines $l_7$, $l_6$, $l_5$ and simultaneously to the battery terminal B through the lines $l_7$, $l_6$, $l_3$ when the ignition switch 20 is closed.

Subsequently, the operation of the conventional wiper in several cases will be described as follows:

(i) The wiper switch 30 is off while the ignition switch 20 is closed.

In this case, the wiper motor 41 is not driven and the wiper blade is also unoperated because the line $l_3$ is cut off the lines $l_1$, $l_2$.

(ii) The wiper switch 30 is in the first closed position LO while the ignition switch 20 is closed.

In this case, the current flows in the following order: battery 10→line $l_7$→ignition switch 20→lines $l_6$, $l_3$→battery terminal B→output terminal +1→line $l_1$→wiper motor 41→ground. The wiper motor 41 driven thereby causes the wiper blade to clean the windshield.

(iii) The wiper switch 30 is in the second closed position HI while the ignition switch 20 is closed.

In this case, the current flows in the following order: battery 10→line $l_7$→ignition switch 20→lines $l_6$, $l_3$→battery terminal B→output terminal +2→line $l_2$→wiper motor 41→ground. The wiper motor 41 driven thereby causes the wiper blade to clean the windshield. Moreover, because the output current of the output terminal +2 is higher than that of the output terminal +1, the number of revolutions of the wiper motor 41 is greater than that in the case of the first closed position LO and consequently the wiper blade moves faster.

(iv) The wiper switch 30 is switched from the closed position HI to LO to off while the ignition switch 20 is closed.

In this case, the output terminal +1 and the stop terminal are connected when the wiper switch 30 is switched from the closed position HI or LO to off. In case the wiper blade is in the midposition of the windshield, the moving contact 42c in contact with the voltage terminal 42a thereby causes the current to flow in the following order: battery 10→line $l_7$→ignition switch 20→lines $l_6$, $l_5$→voltage terminal 42a→moving contact 42c→line $l_4$→stop terminal S→output terminal +1→line $l_1$→wiper motor 41→ground. In consequence, the wiper motor 41 is kept driven even though the wiper switch is opened so as to move the wiper blade. When the wiper blade is moved up to the predetermined lower position of the windshield, the moving contact 42c contacts the ground terminal 42b and causes the wiper blade to stop as the supply of power to the wiper motor 41 is cut off. Consequently, the wiper blade is moved up to the predetermined lower position of the windshield and stopped without being stopped in the midposition. The wiper blade is thus caused to stop without impeding the driver's ken.

Notwithstanding, the prior art poses the following problems: If the ignition switch 20 is switched from the closed to open position while the wiper switch 30 is held is the closed position HI or LO, the wiper motor 41 is caused to stop simultaneously with the aforesaid switching operation and the wiper blade is stopped thereby. For this reason, if the ignition switch 20 is opened while the wiper blade is in the midposition of the windshield, the wiper blade is stopped in the inconvenient mid-position of the windshield. To remedy the disadvantage in that the wiper blade is stopped in the midposition, it requires extremely troublesome operation. More specifically, it requires to close the igtnition switch 20 again and the open the wiper switch 30 so as to confirm that the wiper blade has stopped in the predetermined lower position of the windshield before opening the ignition switch 20.

There is another conventionally used wiper comprising a wiper control switch for producing a signal designating the wiper blade operational mode, an intermittent wiper relay for letting the wiper blade intermittently operate for a predetermined time by operating on receiving the signal specifying the intermittent operation of the wiper blade from the wiper control switch, a wiper motor for driving the wiper blade in response to the signals received from the wiper control switch and the intermittent wiper relay, and wire harness for connecting the aforesaid parts. This wiper makes possible the intermittent operation of its wiper blade because of the operation of the intermittent wiper relay as a circuit, variable intermittent time operation and mist operation wherein the wiper blade is operated once. In such a conventional wiper, the signal directly applied from the wiper control switch to the wiper motor is used to provide low and high speed cleaning operation. In every type of the aforesaid operation, the wiper motor is designed to stop the wiper blade after it has returned to the predetermined stop position when the wiper control switch is turned off.

FIG. 2 shows an example of the construction of a conventional wiper control apparatus.

In FIG. 2, the wiper control apparatus shown therein comprises a wiper motor 1 for driving a wiper blade (not shown) for removing waterdrops attaching to the windshield and the like of an automobile and giving favorable ken to the driver, an intermittent wiper relay 2 for controlling the operation of the wiper motor 1 and letting the wiper blade perform intermittent and mist operation, a wiper control switch for producing a control signal for specifying the operational mode of the wiper blade and controlling not only the intermittent but also high and low speed operation in addition to interrupting opeation, and a washer motor 4 for sending a jet of rinsing water to the windshield.

The wiper controlling apparatus employs voltage +B supplied by a power supply 6 through an ignition switch 5 as operational power supply voltage.

The ignition switch 5 includes a switch SW1 for supplying the power supply voltage +B to systems other than the engine system and a switch SW2 for supplying the power supply voltage +B to the engine system when the switch 2 conducts so as to make the engine operable. The operational power supply voltage is supplied to the wiper control apparatus through the switch SW1.

The wiper motor 1 is equipped with a wiper motor 11 for operating the wiper blade at high or low speed and a limit switch 12 for detecting whether or not the wiper blade has returned to (or stopped at) the predetermined reset position. The motor 11 is designed to revolve at high speed when the power supply voltage +B is given to the input terminal H and at low speed when the power supply voltage +B is supplied to the input terminal L. The limit switch 12 operates in such a manner as to connect the S terminal to a ground terminal E when the wiper blade returns to the reset position and, while the wiper blade remains in the midposition of the windshield, connect the terminal S to the terminal B supplied with the power supply voltage +B. Accordingly, the position of the wiper blade is detectable.

The intermittent wiper relay 2 is equipped with a terminal a connected to the terminal S of the wiper control switch 3, a terminal b connected to the terminal S of the limit switch 12, a terminal c for receiving the power supply voltage +B, a terminal d connected to the ground potential of the wiper system through the terminal W of the wiper control switch 3, a terminal f connected to the terminal I of the wiper control switch 3, and a terminal e connected to the ground potential. The intermittent wiper relay 2 is activated when its terminal f is given an activating signal and makes the wiper blade intermittently operate through the wiper motor 1. The control of such intermittent operation is implemented under the control of its internal circuit (not shown). While the wiper relay 2 is unoperative (when the inactive signal is given to the terminal f), the terminals a, b are kept in conduction.

The wiper control switch 3 includes an OFF switch for generating a signal instructing the wiper blade to stop operating, an INT switch for producing a signal instructing the wiper blade to operate intermittently, a HI switch for causing the wiper blade to operate at high speed, and a LOW switch for letting the wiper blade to operate at low speed.

The OFF switch is so arranged as to connect the terminals L, S of the wiper motor 1 through the intermittent wiper relay 2 and stop the operation of the wiper blade. The INT switch is employed to connect the terminals L, S of the wiper motor 1 through the intermittent wiper relay 2 and, by grounding the terminal f of the intermittent wiper relay 2 through the terminal I, given intermittent operation. The LOW switch supplies the power supply voltage +B to the terminal L of the motor 11 of the wiper motor 1 and causes the motor 11 to operate at low speed, whereas the HI switch supplies the voltage +B to the terminal H of the motor 11 and causes the motor 11 to operate at high speed.

In the washer motor 4, the terminal B is supplied with the power supply voltage +B through the switch SW1 of the ignition switch 5, whereas the ground terminal W is grounded at all times through the wiper control switch 3. Accordingly, the washer motor 4 is actuated whenever the switch SW1 of the ignition switch 5 is conducted and usable to supply rinsing liquid to the windshield. Subsequently, the operation will be described.

By keeping the switch SW1 at the first stage of the ignition switch 5 in conduction, the operational power supply voltage +B is supplied from the wiper control system, whereby the wiper control circuit is made operable. On receiving the power supply voltage +B through the switch SW1, the washer motor 4 rotates and makes possible the supply of the rinsing liquid. Any operational instruction to be given to the wiper blade is given by conducting any one of the operational instructing switches of the wiper control switch 3. More specifically, the Hi switch of the wiper control switch is energized to operate the wiper blade at high speed while the power supply voltage +B is supplied to the terminal H of the motor 11. When the wiper blade is operated at low speed, the LOW switch is conducted and the power supply voltage +B is supplied to the terminal L of the motor 11. The motor is thus rotated at high or low speed and the wiper blade is consequently moved at high or low speed.

In order to operate the wiper blade intermittently, it can be attained by conducting the INT switch, placing the terminal f of the wiper relay 2 to the ground potential and making the intermittent wiper relay 2 active. The terminal L of the motor 11 and the terminal S of the limit switch 12 are connected to the terminals a, b of the intermittent wiper relay 2, respectively. The limit switch 12 is used to make the terminal S equal to the ground potential through the terminal E when the wiper blade is restored to the reset position and to connect the terminal S to the power supply voltage +B through the terminal B when the wiper blade is in the midposition. The intermittent wiper relay 2 responds when the intermittent operation instructing signal is given to the terminal f and controls the operation of the motor 11 by giving the power supply voltage +B from the terminal a to the terminal L of the motor 11 through the wiper control switch 3. In other words, when the intermittent operation instructing signal is given to the wiper control switch 3, the switch causes its terminal a to produce the voltage +B for a predetermined period of time and the motor 11 to rotate at low speed through the control switch 3, so that the wiper blade is operated. When the wiper blade is returned to the reset position upon the completion of the first operation of the wiper blade, the terminal S of the limit switch 12 is connected to the terminal E so that the ground potential is established in the terminal S. When the ground potential is established in the terminal S, the terminal b of the intermittent wiper relay 2 is at the ground potential. The intermittent wiper relay 2 responds to the ground potential of the terminal b and causes the terminal a to be at the groupnd potential and also the terminal L of the motor 11 to be at the ground potential through the wiper control switch 3. Further the intermittent wiper relay 2 stops the motor 11 from turning and thus stops the wiper blade from operating. After the passage of a predetermined time, the intermittent wiper relay makes the terminal a supply the power supply voltage +B from the terminal a again to turn the motor 11, so that the aforesaid operation is repeated. As the power supply voltage +B supplied from the terminal a, the voltage +B given to the terminal c is employed. The control of the intermittent operation is performed by a control circuit (not shown) included in the intermittent wiper relay 2.

When the OFF switch of the wiper control switch 3 is conducted to stop the operation of the wiper blade, the terminals L, S of the wiper motor 11 are connected through the intermittent wiper relay 2. While the intermittent wiper relay is left unoperative, its terminals a, b are made conductive thereby. Accordingly, when the wiper blade is not in the reset position but in the midposition, the terminal S of the limit switch 12 is kept connected to the terminal B and the motor 11 is allowed to continue to turn. When the wiper blade is returned to the reset position, the terminal S of the limit switch 12 is connected to the terminal E and the terminal L of the motor 11 is set at the ground potential, so that the motor 11 stops turning.

If the wiper control switch 3 is turned off during the intermittent operation of the wiper blade, the terminal f of the intermittent wiper relay 2 is not supplied with the ground potential and, because the terminals a, b are connected, the motor 11 stops turning after the wiper blade is returned to the reset position.

As set forth above, even though the wiper control switch 3 is turned off during the operation of the wiper in the conventional wiper control circuit, the wiper motor 1 is caused to stop operating after the wiper blade is returned to the reset position.

However, since the power supply voltage for operating the wiper control circuit is supplied through the ignition switch 5, the power supply voltage therefor is stopped immediately after the ignition switch 5 is turned off. In consequence, the motor 11 stops to operate when the ignition switch 5 is turned off during the operation of the wiper blade, thus causing no power supply voltage to be supplied to the wiper control circuit. Accordingly, the wiper blade is stopped in the midposition without being returned to the stop (reset) position.

In order to bring the wiper blade to the stop position based on the aforesaid understanding, the following troublesome steps are required: namely, the steps of conducting the switch SW1 in the first stage of the ignition switch 5 again, making the wiper control circuit operational, then turning off the wiper control switch 3 and turning off the switch SW1 of the ignition switch 5 after confirming that the wiper blade has stopped at the reset position.

Assuming that the driver has left the wiper blade in the midposition without noticing that he has forgotten to turn off the wiper control switch 3 and that he has come to notice the aforesaid fast later, the wiper blade may be moved to the reset position immediately when the switch SW1 at the first stage of the ignition switch is turned on and the windshield may be damaged by the dust and the like sticking thereto.

SUMMARY OF THE INVENTION

In view of the prior art, an object of the present invention is to provide a wiper control apparatus for allowing a wiper blade to move down to the predetermined lower position of a windshield and stop thereat even when an ignition switch is released.

Another object of the present invention is to provide a wiper control apparatus for a motor vehicle, the wiper control apparatus being capable of ensuring that a wiper motor is turned until a wiper blade is returned to the reset position even if an ignition switch is turn off while the wiper blade is operated and equipped with alarm generating means for giving a warning to the driver who has forgotten to turn off a wiper control switch when he turns off the ignition switch without turning off the wiper control switch.

Still another object of the present invention is to provide a wiper control apparatus for a motor vehicle, the wiper control apparatus being capable of ensuring that a wiper blade is returned to the reset position even if an ignition switch is turned off while the wiper blade is operated and that the wiper blade performs no desired operation until a wiper control switch is turned off once even though the ignition switch is turned on again after being turned off while the wiper control switch is in the closed position.

In order to accomplish the aforesaid obejcts, a wiper control apparatus embodying the present invention comprises a wiper switch whose output terminal connects to a battery terminal in the closed state and connects to a stop terminal in the opened state;
  wiper driving means having a wiper motor for driving a wiper on receiving power through the output terminal of the wiper switch and a cam switch having a voltage terminal for receiving power, a grounded terminal and a moving contact connected to the stop terminl of the wiper switch, the moving contact being switched to the grounded terminal while the wiper blade stays in a predetermined lower position of a windshield and to the voltage terminal when the wiper blade stays in a position other than the predetermined lower one;
  further, a switch means for passing the current supplied by the battery in its closed state, but not via an ignition switch, sending the current to the voltage terminal of the cam switch and the battery terminal of the wiper switch and cutting off the current in the opened state;
  a first diode for allowing the current passed through the ignition switch to flow therein;
  a second diode for allowing the current passed through the voltage terminal and the moving contact of the cam switch to flow therein; and
  wiper auto-off means formed with ON/OFF decision means for placing the aforesaid switch means in the ON state provided that the wiper switch is turned off and that the ignition switch is turned on, whereby the current is caused to flow from the ignition switch through the first diode; thereafter, holding the aforesaid switch means in the ON state provided that the current is caused to flow from the first or second diode; moreover, turning off the aforesaid switch means provided that the ignition switch is turned off so that the flow of the current from the first diode is stopped and that the moving contact of the cam switch is separated from the voltage terminal so that the flow of the current from the second diode is stopped.

A wiper control apparatus embodying the present invention comprises a first delay circuit for conducting in response to the ON state of an ignition switch, non-conducting in response to the OFF state of the ignition switch and transmitting the voltage of a power supply to the power supply system of the power control apparatus;

a second relay for transmitting an output signal of a wiper control switch or intermittent wiper relay to a wiper motor in response to the ON state of the ignition switch and transmitting an output signal of a limit switch for detecting the position of a wiper blade in response to the OFF state of the ignition switch; and alarm generation means for becoming operational in response to the OFF state of the ignition switch and generating an alarm in response to a wiper bldae midposition detection signal given by the limit switch.

The first relay keeps the wiper control apparatus operational at least until the wiper blade is returned to the reset position even after the ignition switch is turned off and, since the second relay supplies the output of the limit switch to the wiper motor when the ignition switch is turned off while the wiper blade is placed in the midposition, the wiper motor is caused to rotate until the wiper blade is restored to the stop position, whereas the alarm generating means produces an alarm if the wiper blade is placed in the midposition while the ignition is held off.

A wiper control apparatus embodying the present invention comprises a timer circuit staying in an ON state while an ignition switch (a first relay) is held on and for a predetermined time interval after the ignition switch is turned off; a second relay for being driven by the output of the timer circuit and transmitting battery power supply voltage to the power supply system of a wiper control circuit; and a third relay for being connected across a wiper control switch and a wiper motor, for transmitting the output signal of the wiper control switch to the wiper control motor by setting one of the HI, LOW and INT switches conductive on condition that the wiper control switch is turned off once when the ignition switch is turned on, and transmitting the output signal of a limit circuit for detecting the position of the wiper blade while the ignition switch is held off to the wiper motor.

The second relay is used to supply the power supply voltage to the power supply system of the wiper control circuit while the ignition switch is held off and at least until the wiper blade is returned to the initial position after the ignition switch is turned off, whereas the third relay is used to return the wiper blade to the initial position by transmitting the output signal of the limit switch to the wiper motor when the ignition switch is changed from ON to OFF. When the ignition switch is changed from OFF to ON while the wiper control switch is held on, the third relay is not allowed to transmit the signal for driving the wiper blade to the wiper motor unless the wiper control switch is turned off once.

BRIEF DESCRIPTION OF THE DRAWINGS

FIG. 9 shows a time chart representing the operation of the embodiment of FIG. 8.

DESCRIPTION OF THE PREFERRED EMBODIMENTS

Referring now to the accompanying drawings, the preferred embodiment of the present invention will be described.

Figure 1:
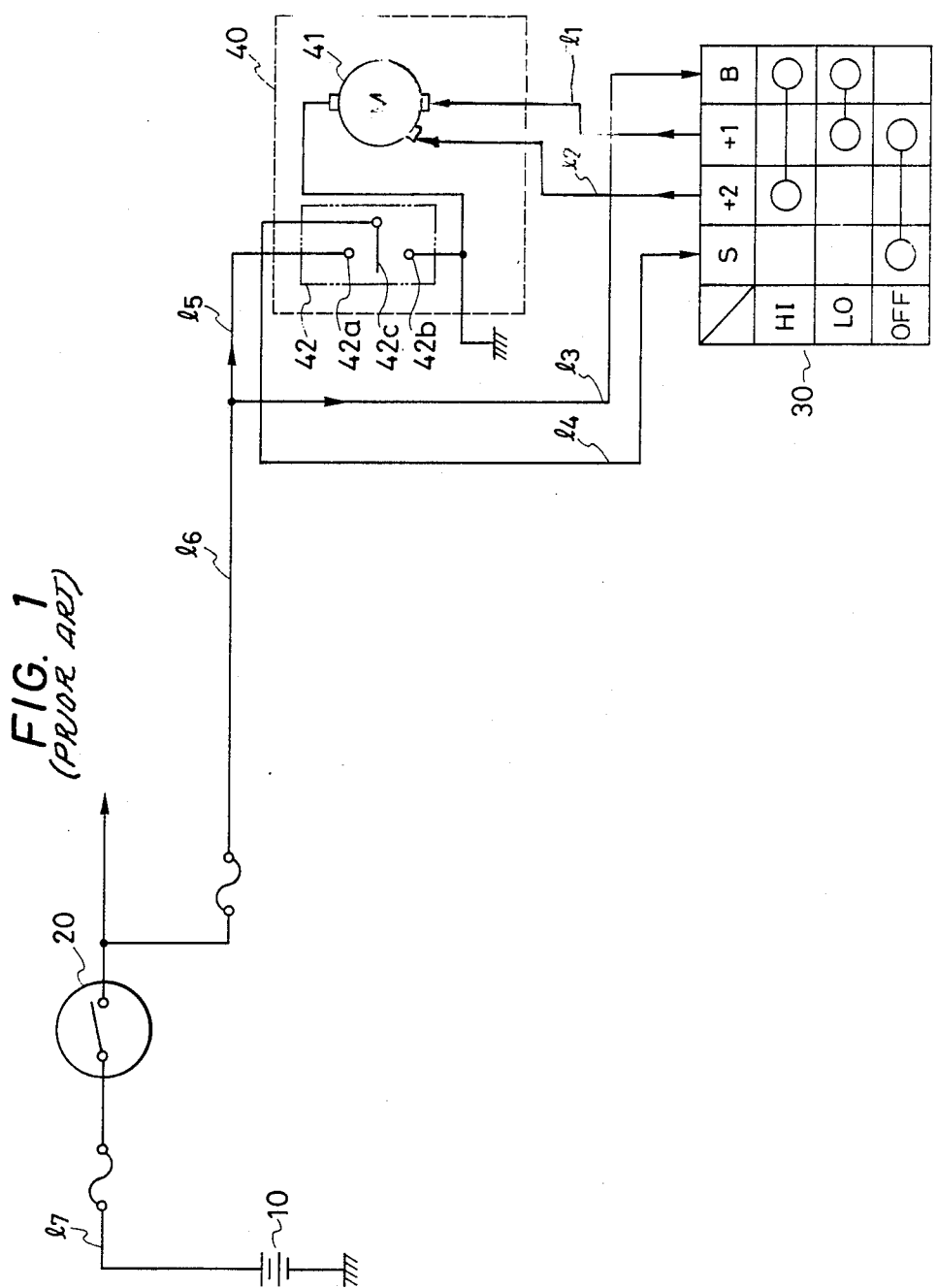
FIG. 1 shows a diagram of the contruction of the conventional wiper control apparatus.
Figure 3:
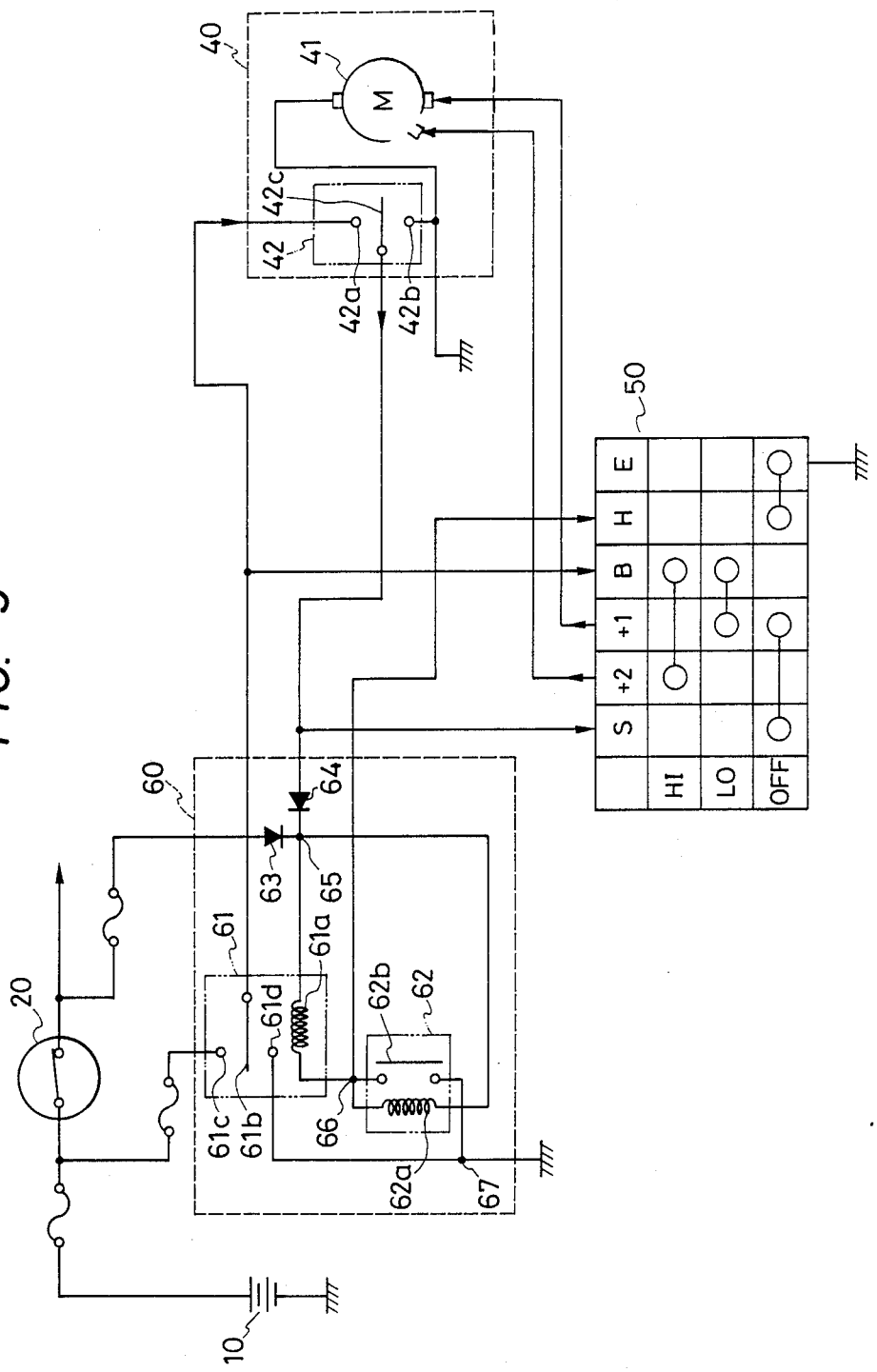
FIG. 3 shows a circuit diagram embodying the present invention.

FIG. 3 shows an embodiment of the present invention, wherein there is shown a circuit diagram comprising a battery 10, an ignition switch 20, wiper driving means 40, a wiper motor 41, a cam switch 42, a voltage terminal 42a, a grounded terminal 42b, and a moving contact 42c, the aforesaid components being similar to those shown in FIG. 1 as what represents a conventional example. Moreover, a wiper switch 50 and an auto-off means 60 have been added to the aforesaid embodiment of the present invention.

The wiper switch 50 is turned off, set to LOW as the first closed state and HI as the second closed state. When the switch 50 is turned off, a stop terminals S and a first output terminla +1 are connected, whereas an H terminal and a grounded terminal H as a ground potential are connected. When the switch 50 is set to LO, the first output terminal +1 and a battery terminal B are connected and, when it is set to HI, a second output terminal +2 and the battery terminal are connected.

The auto-off means 60 consists of a main relay 61, an ON/OFF decision relay 62, a first diode 63 and a second diode 64. Of the aforesaid parts, the main relay 61 is placed in an ON state when a coil 61a is excited as a contact 61b is connected to a terminal 61c and in an OFF state when the coil 61a is unexcited as the the contact 61b is connected to a terminal 61d. The ON/-OFF decision relay is a normally opened-type relay consisting of a coil 62a and a contact point 62b. The diode 63 allows the current to flow from the ignition switch 20 to the auto-off means 60, whereas the diode 64 allows the current to flow from the moving contact 42c of the cam switch 42 to the auto-off means 60.

Figure 4:
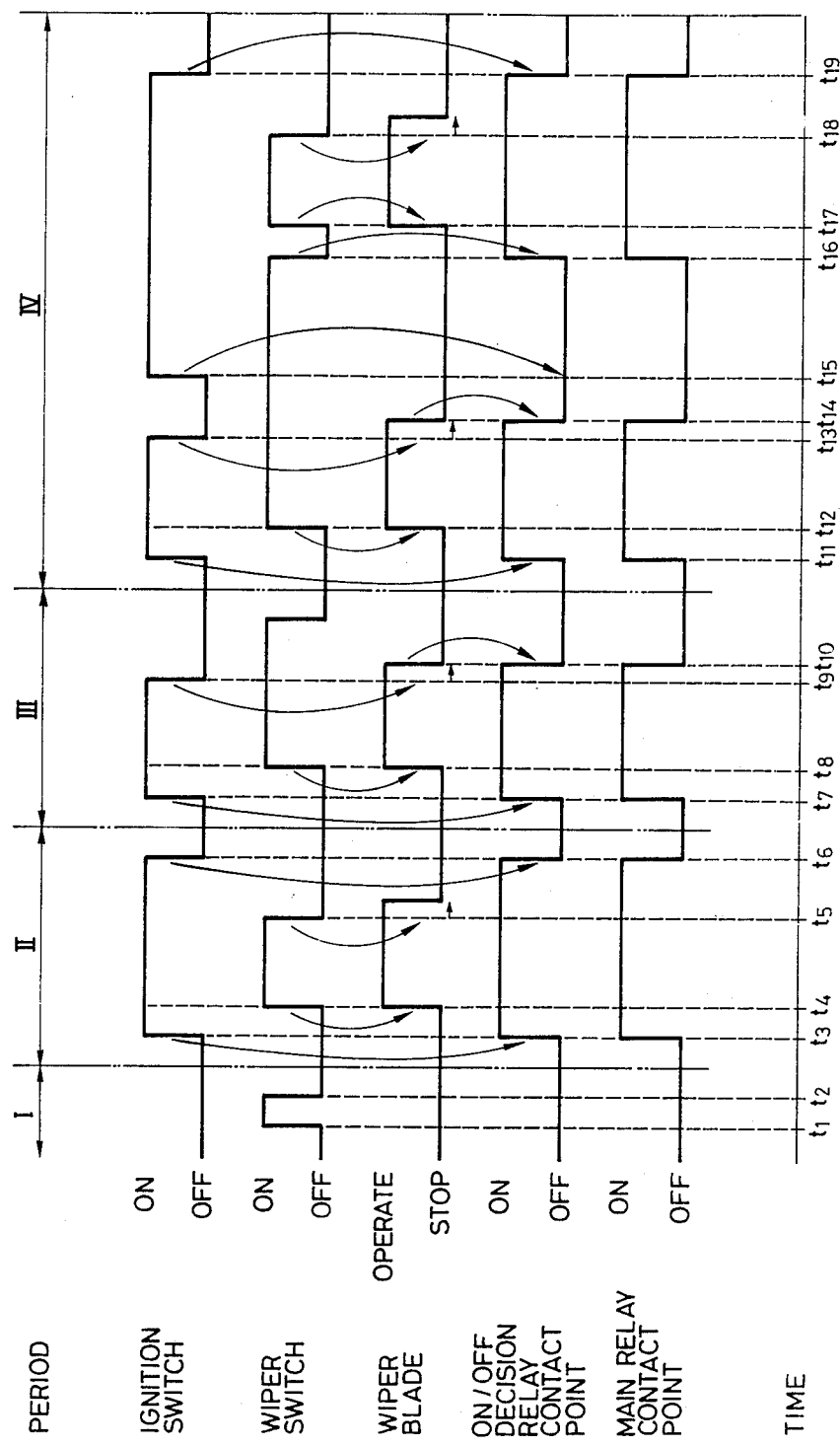
FIG. 4 shows a time chart representing the operation of the embodiment of FIG. 3.

Referring to FIG. 4 showing a time chart, the operation of the first embodiment of FIG. 3 will subsequently be described on a period basis.

(I) Operation during a period I.

While the ignition switch is held off, the wiper switch is not operated even if the wiper switch is turn on (time $t_1$) or off (time $t_2$).

(II) Operation during a period II.

If the ignition switch is turned on (time $t_3$) while the wiper switch 50 is held off, the current flows in the following order: battery 10→ignition switch 20→diode 63→crossing junction 65→coils 61a, 62a→crossing junction 66→terminal H→grounded terminal E→ground. Consequently, the coils 61a, 62a are excited, whereby the contact 61b is connected to the terminal 61c and the contact 62b is closed. When the contact 61b is closed, the current supplied by the battery 10 is sent to the voltage terminal 42a of the cam switch 42 and the battery terminal B of the wiper switch 50 through the main relay 61. When the contact 62b is closed, the current flows in the following order: battery 10→ignition switch 20→diode 63→crossing junction 65→coils 61a→crossing junction 67→ground, whereby the main relay 61 and the ON/OFF detection relay 62 are kept closed. Accordingly, even though the wiper switch 50 is changed from OFF to LO, HI, i.e., the apparatus cannot be grounded through the wiper switch 50, the relays 61, 62 are held on.

If the wiper switch 50 is set to LO or HI (time $t_4$) while the closed state of the main and ON/OFF detection relays is self-maintained, the current supplied from the battery 10 to the battery terminal B of the wiper switch 50 through the main relay 61 is supplied to the wiper motor 41 through the output terminal +1 or +2. Consequently, the wiper blade is operated as the wiper motor 41 is driven.

If the wiper switch 50 is turned off (time $t_5$)then, the wiper blade stops to operate as the wiper motor 41 stops. At that time, because of the action of the cam switch 42, the wiper blade moves to the predetermined lower position of the windshield and then stops. As the wiper switch 50 is turned on and off, the wiper blade is operated and stopped to operate in the same manner as in the case of a conventional wiper.

If the ignition switch 42 is turned off, further (time $t_6$), no current flows into the coils 61a, 62a, which are consequently not excited. Therefore, the contacts 61b is connected to the terminal 61d and placed in the OFF state and the contact 62b is set to OFF.

(III) Operation during a period III

If the ignition switch 20 is turned on (time $t_7$) while the wiper switch 50 is held off, the contact 61b is connected to the terminal 61c and placed in the closed state as in the case of time $t_3$, whereas the contact 62b is also placed in the closed state. When the wiper switch 50 is set to LO or HI (time $t_8$), the wiper switch is operated as in the case of time $t_4$.

If the ignition switch 20 is turned off (time $t_3$) while the wiper switch is held LO or HI, no current flows into the auto-off means 60 through the diode 63. At this time, since the moving contact 42c is connected to the voltage terminal 42a while the wiper blade is in the midposition of the windshield, the current supplied through the voltage terminal 42a and the moving contact 42c is allowed to flow into the auto-off means 60 through the diode 64. For this reason, even though the ignition switch is turned off, the current flowing through the diode 64 causes the coils 61a, 62a to be excited while the wiper blade remains in the midposition of the windshield, so that the contact 61b is kept in contact with the terminal 61c. Accordingly, power is still supplied to the wiper motor 41 and the wiper blade is operated. When the wiper blade thus operated is placed in the predetermined lower position of the windshield, the moving contact 42c is connected to the grounded terminal 42b (time $t_{10}$). Then the current is prevented from flowing into the auto-off means 60 through the diode 64 and the coils 61a, 62a are no longer excited and further the contact 61b is connected to the terminal 61d, i.e., the contact 62b is placed in the opened state. The current supplied by the battery 10 is cut off by the main relay 61 and stopped from being supplied to the wiper switch 50 and the wiper driver 40, whereby the wiper blade is stopped in the predetermined lower position of the windshield. In addition, the counter electromotive force generated in the wiper motor 41 is discharged through the following path: wiper motor 41→output terminal +1 or +2→battery terminal B→contact 61b→terminal 61d→crossing junction 67→ground.

In the aforesaid manner, the wiper blade can be stopped in position even when the ignition switch 20 is turned off while the wiper switch 50 is held on. This is the most important novel feature of this embodiment.

(IV) Operation during a period of IV

At time $t_{11}$, $t_{12}$, $t_{13}$, $t_{14}$ during a period of IV, operation similar to that at time $t_7,t_8$, $t_9$, $t_{10}$ during the period III is conducted. That is, the wiper blade can be stopped in position by turning off the ignition switch 20.

Even if the ignition switch in the opened state is turned on (time $t_{15}$) while the wiper switch is held on, the wiper remains unoperated. The reason for this is that the wiper switch 50 in the closed stated cannot be grounded through the ground terminal E of the wiper switch 50 and no current is supplied to the coil 62a, whereby the main relay 61 is left in the OFF state. Waste of operation time can thus be avoided because the wiper blade remains unoperated even if the ignition switch 20 is turned on again after the wiper blade is stopped by turning off the ignition switch 20.

If the wiper switch 50 is turned on (time $t_{16}$) then, however, the main relay 61 is turned on as the ON/OFF decision relay 62 is turned on as in the case of time $t_3$ during the period of II and besides both the relays 61, 62 are kept in the closed state. Therefore, the wiper is operated and stopped to operate as the wiper switch 50 is turned on and off (time $t_{17}$, $t_{18}$) thereafter and moveover the relays 61, 62 are turned off when the ignition switch 20 is turned off (time $t_{19}$).

In the case of the embodiment of FIG. 3, the coil 62a of the ON/OFF decision relay 62 is arranged on the grounded side and the coil 61a of the main relay 61 is arranged on the power supply side. However, the arrangement of them may be reversed. Moreover, the autooff means 60 may be integrated with the wiper driver 40, the wiper switch, further intermittent wiper relay, etc.

Figure 5:
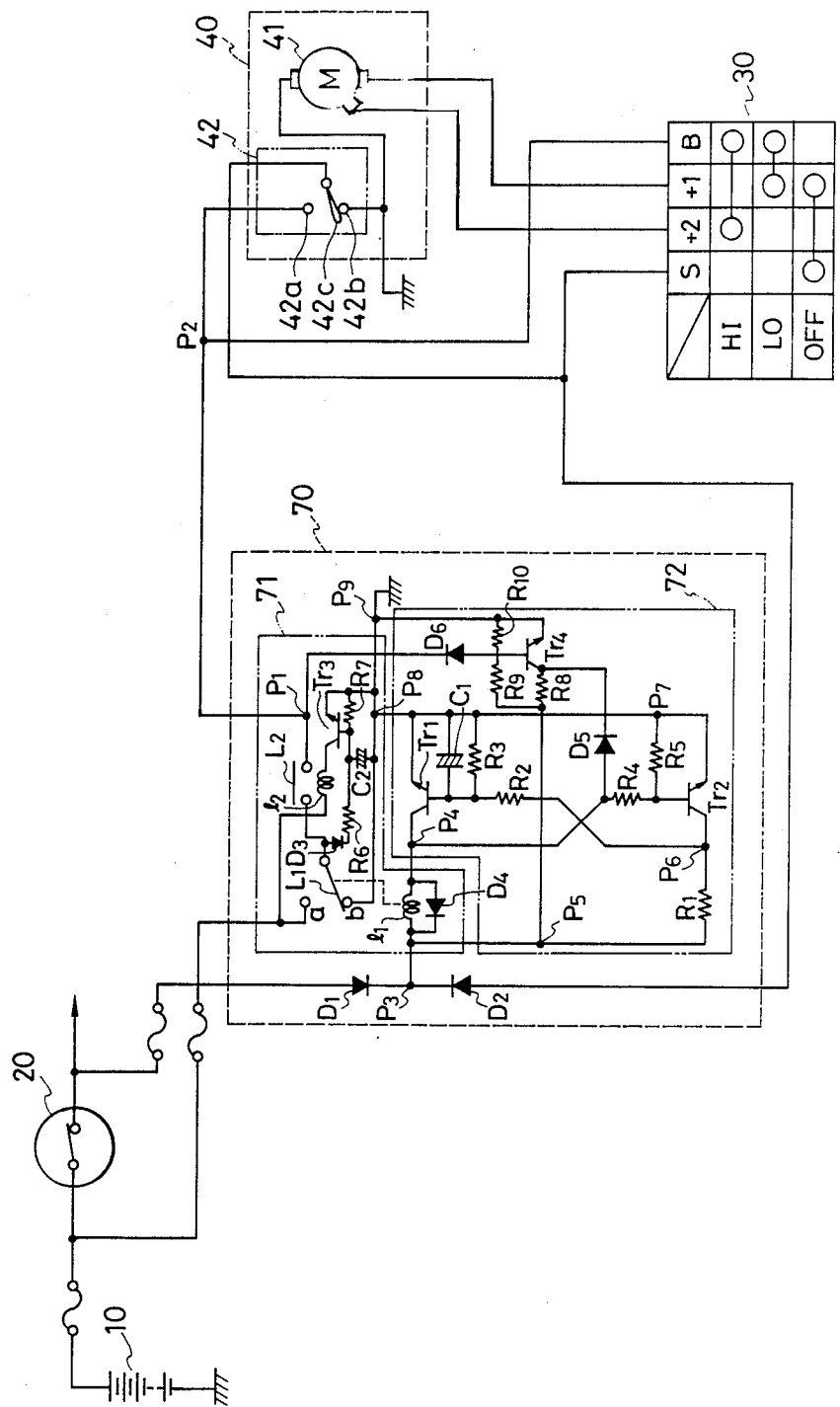
FIG. 5 shows another circuit diagram embodying the present invention

FIG. 5 shows another embodiment of the present invention, wherein it includes a battery 10, an ignition switch 20, a wiper switch 30, a wiper driver 40, a wiper motor 41, a cam switch 42, a voltage terminal 42a, a grounded terminal 42b and a moving contact 42c. Parts other than those enumerated above are similar to those shown in FIG. 3. An auto-off means 70 is also added to this embodiment.

The auto-off means 70 consists of a switching circuit 71, an ON/OFF decision circuit 72, a first diode $D_1$ and a second diode $D_2$.

The switching circuit 71 is formed of a main relay consisting of a coil $l_1$ and a contact $L_1$, a relay consisting of a coil $l_2$ and a contact $L_2$, a transistor $Tr_3$, a capacitor $C_2$, diodes $D_3$, $D_4$, and resistors $R_6$, $R_7$. The contact $L_1$ is connected to the terminal a and placed in the closed state when the coil $l_1$ is excited and connected to the terminal b and placed in the opened state when the coil $l_2$ is excited. The contact $L_2$ is placed in the closed state when the coil $l_2$ is excited and in the opened state when the coil $l_2$ is left unexcited.

The ON/OFF decision circuit 72 is formed of transistors $Tr_1$, $Tr_2$, $Tr_4$, a capacitor $C_1$, diodes $D_5$, $D_6$, and resistors $R_1$, $R_2$, $R_3$, $R_4$, $R_5$, $R_8$, $R_9$, $R_{10}$. When the voltage is applied to the base of the transistor $Tr_4$, it is cut off provided the wiper switch is set to LO or HI and conducts on condition that the wiper switch 30 is held off. The reason is that (resistor $R_{10}$>>(resistance of the wiper motor 41); i.e., the voltage divided by the resistors $R_9$, $R_{10}$ is applied to the base of the transistor $Tr_4$ while the wiper switch 30 is held off to let is conduct, whereas the base of the transistor $Tr_4$ is grounded while the wiper switch 30 is held on as the current is led in the following order: diode $D_6 \rightarrow$ crossing junction $P_1 \rightarrow$ crossing junction $P_2 \rightarrow$ output terminal $+1$ or $+2 \rightarrow$ wiper motor $41 \rightarrow$ ground. Consequently, the base potential becomes almost zero and the transistor $Tr_4$ is cut off.

The operation of the second embodiment in various cases will subsequently be described.

(a) When the ignition switch is turned on while the wiper switch 30 is held on.

When the ignition switch 20 is turned on, the voltage is passed through: battery $10 \rightarrow$ ignition switch $20 \rightarrow$ diode $D_1 \rightarrow$ crossing junction $P_3 \rightarrow$ coil $l_1 \rightarrow$ crossing junction $P_4 \rightarrow$ resistor $R_4$; then applied to the base of the transistor $Tr_2$, whereas it is passed through: battery $10 \rightarrow$ ignition switch $20 \rightarrow$ diode $D_1 \rightarrow$ crossing $P_3 \rightarrow$ crossing $P_5 \rightarrow$ resistor $R_1 \rightarrow$ resistor $R_2$; then applied to the base of the transistor $Tr_1$. At this time, the base potential of the transistor $Tr_1$ gradually rises as the capacitor $C_1$ is charged and the rise of the potential slower than that of the transistor $Tr_2$. In consequence, $Tr_2$ conduits simultaneously when the ignition switch 20 is turned on. The current flowing in through the diode $D_1$ is caused to flow in the path formed in the following order; diode $D_1 \rightarrow$ crossing junction $P_3 \rightarrow$ crossing junction $P_5 \rightarrow$ resistor $R_1 \rightarrow$ crossing junction $P_6 \rightarrow$ transistor $Tr_2 \rightarrow$ crossing $P_7 \rightarrow$ crossing junction $P_8 \rightarrow$ crossing junction $P_9 \rightarrow$ ground. For this reason, the collector potential (potential at the crossing $P_6$) of the transistor $Tr_2$ becomes close to zero, thus causing the base potential of the transistor $Tr_1$ to becomes almost zero to ensure that the transistor $Tr_1$ is cut off.

(b) When the wiper switch is turned off after (a).

When the wiper switch 30 is turned off after the aforesaid operation, the transistor $Tr_4$ conducts as described above. Accordingly, the base of the transistor $Tr_2$ is grounded in the following order: resistor $R_4 \rightarrow$ diode $D_5 \rightarrow$ transistor $Tr_4 \rightarrow$ crossing junction $P_9 \rightarrow$ ground; the base potential of the transistor $Tr_2$, which is then cut off. When the transistor $Tr_2$ is cut off, its collector potential rises and simultaneously the base potential of the transistor $Tr_1$ rises as the capacitor $C_1$ is charged, ultimately causing the transistor $Tr_1$ to conduct. When the transistor $Tr_1$ conducts, its collector potential becomes almost zero, whereby the transistor $Tr_2$ to the contrary of the preceeding case (a).

When the transistor $Tr_1$ conducts, the current is passed through and used to excite the coil $l_1$ and the contact $L_1$ is connected to the terminal a. Then the voltage is supplied to the base of the transistor $Tr_3$ through: battery $10 \rightarrow$ terminal $a \rightarrow$ contact $L_1 \rightarrow$ diode $D_3 \rightarrow$ resistor $R_6$; and the transistor $Tr_3$ conducts as the capacitor $C_2$ is charged.

Ultimately, when the wiper switch 30 is turned off and when the ignition switch 20 is turned on, the contacts $L_1$, $L_2$ are placed in the closed state and the supply of power from the battery 10 to the battery terminal B of the wiper switch 30 and the wiper driver 40 through both the contacts $L_1$, $L_2$ is started. Moreover, even if the wiper switch 30 is held on, the contacts $L_1$, $L_2$ are kept in the closed state and the wiper is operated and stopped to operate as the wiper switch 30 is turned on and off provided the ignition switch 20 is held on. (c) When the ignition switch 20 is turned off in the case of auto-off, i.e., while the wiper switch 30 is held on.

When the ignition switch is turned off, no current is caused to flow into the auto-off means 70 through the diode $D_1$. At this time, because the moving contact $42c$ is connected to the voltage terminal $42a$ while the wiper blade is placed in the midposition of the windshield, the current led through the voltage terminal $42a$ and the moving contact $42c$ is caused to flow into the auto-off means 70. Accordingly, even though the ignition switch 20 is turned off, the current led through the diode $D_2$ causes the coil $l_1$ to excite while the wiper blade remains in the midposition of the windshield, whereas the contact $L_1$ is connected to the terminal a. The power is therefore still supplied to the wiper motor 41 and the wiper blade is operated. The wiper blade is thus operated and, when it reaches the predetermined lower position of the windshield, the moving contact $42c$ is connected to the grounded terminal $42b$ this time. Then the supply of the current to the auto-off means 70 through the diode $D_2$ is stopped and the coil $l_2$ becauses unexcited and the contact $L_1$ is connected to the terminal b and placed in the opened state and the supply of the power to the wiper switch 30 and the wiper driver 40 is stopped, whereby the wiper blade is stopped in the predetermined lower position of the windshield. At this time, the contact $L_2$ is held on until the potential of the transistor $Tr_3$ is lowered after the current is circulated through the closed circuit consisting of: capacitor $C_2 \rightarrow$ resistor $R_7 \rightarrow$ capacitor $C_2$; and discharged. The counter electromotive force generated in the wiper motor 41 is instantly released by the closed loop: ground-wiper motor $41 \rightarrow$ output terminal $+1$ or $+2 \rightarrow$ terminal $B \rightarrow$ crossing junction $P_2 \rightarrow$ contact $L_2 \rightarrow$ contact $L_1 \rightarrow$ terminal $b \rightarrow$ crossing junction $P_8 \rightarrow$ crossing junction $P_9 \rightarrow$ ground; and the wiper motor 41 is immediately stopped.

(d) When the ignition switch is turned on while the autooff means is kept in operation.

Due to the operation in the case of (a), the transistors $Tr_2$ and $Tr_3$ are conducted and cut off, respectively. Moreover, since the wiper switch is held on, the transistor $Tr_4$ is held off, whereas the transistors $Tr_1$, $Tr_2$ are left unchanged. Consequently, no current is caused to flow into the coil $l_1$ and left unexcited and the contact $L_1$ is kept in contact with the terminal b. The contacts $L_1$, $L_2$ are maintained in the opened state and the wiper is also left unmovable.

(e) Release of the operation of auto-off means.

When the wiper switch 30 is turned off, the transistor $Tr_4$ conducts and returns to normal operation thenceafer.

Figure 6:
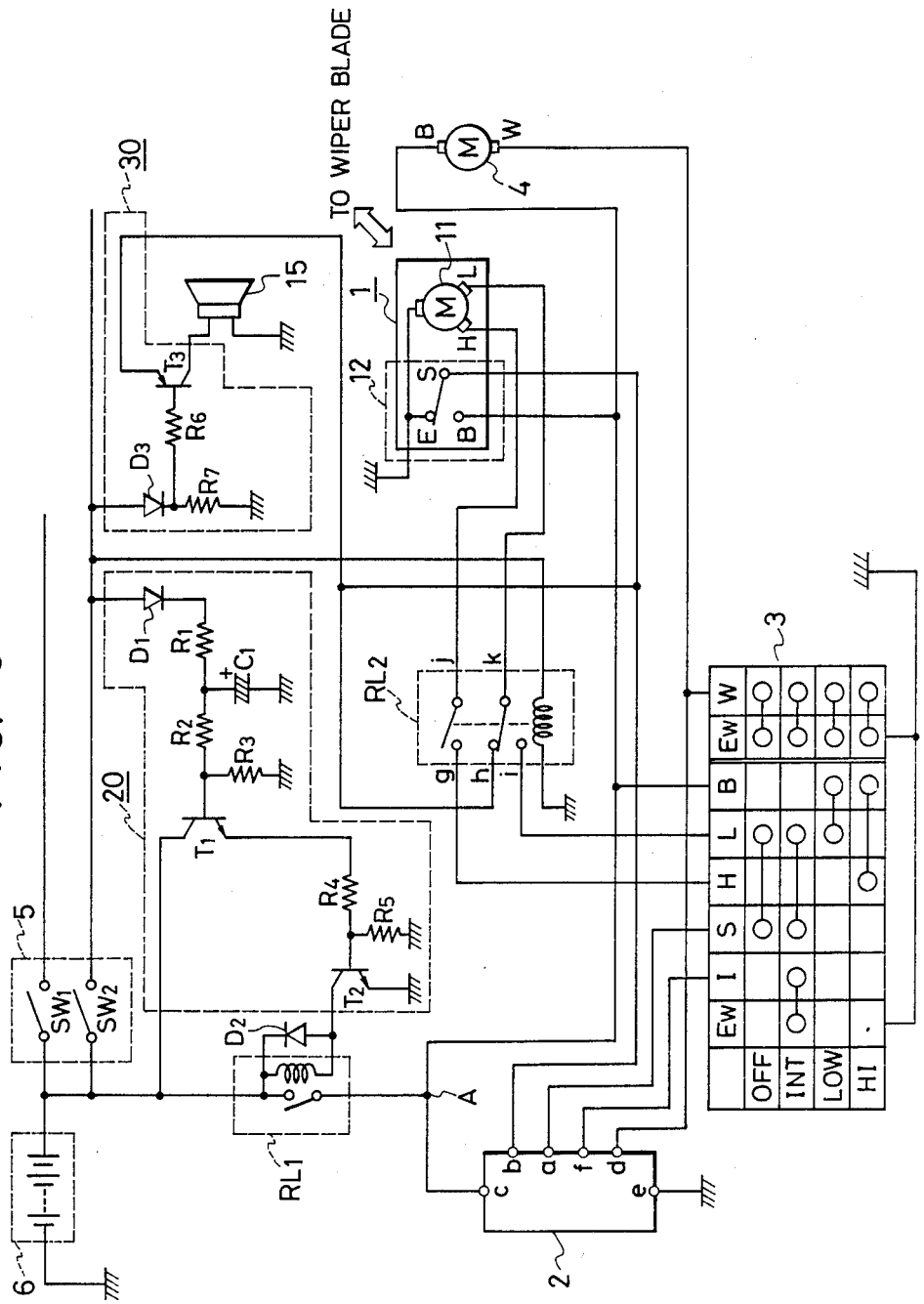
FIG. 6 shows still another circuit diagram embodying the present invention.

FIG. 6 shows still another wiper control apparatus embodying the present invention. In FIG. 6, like reference characters designate like or corresponding parts of FIG. 3. The wiper control apparatus shown in FIG. 6 includes a relay RL1 for transmitting power supply voltage $+B$ from a battery power supply 6, a timer circuit 20 for controlling the operation of the relay RL1, a relay RL2 for being turned on and off in response to the output of an ignition switch 5 and transmitting either the outputs of an intermittent wiper 2 and a wiper control switch 3 or a signal from the terminal S of a limit switch 12 to the motor 11 of a wiper motor 1, and an alarm generator block 30 for being operated in response to the OFF state of the ignition switch and giving an alarm in response to the output signal of the limit switch 12 while the wiper blade remains in the midposition of the windshield.

The input terminal of the relay RL1 is connected to the battery power supply 6 and the output terminal thereof to a node A so as to supply the voltage +B to the power supply system of the wiper control apparatus. A diode D2 for absorbing reverse voltage is connected to the relay RL1 in parallel. The relay RL1 is excited when the current flows into its coil and conducts then.

The timer circuit 20 includes an npn transistor T1 which is turned on in response to the ON state of a switch SW2 at the second stage of the ignition switch 5 and an npn transistor T2 turned on in response to the ON state of the transistor T1. The collector of the transistor T1 is connected to the power supply 6 and its emitter is connected to the base of the transistor T2 through a resistor R4 and its base is coupled to the output side of the switch SW2 at the second stage of the ignition switch 5 through a diode D1 and resistors R1, R2. The diode D1 is used for rectification and the resistors R1, R2 are used to supply the predetermined base current to the base of the transistor T1, where as the resistor R3 is used to stabilize the operation of the transistor T1. A capacitor C1 used as a delay capacitor and coupled to the connection between the resistors R1, R2 is charged with the voltage supplied through the diode D1 and the resistor R1 and discharges in response to the OFF state of the ignition switch and, by supplying the current to the base of the transistor T1, holds the transistor T1 on using the discharge current. The collector of the transistor T2 is connected to the coil of the relay RL1, whereas its emitter is grounded. The current is caused to flow through the coil of the relay RL1 when the transistor T2 is turned on and the relay RL1 conducts.

The relay RL2 is excited in response to the voltage supplied through the switch SW2 at the second stage of the ignition switch 5 and conducts. The input terminals g, i are connected to the output terminals j, k, respectively. When the switch SW2 is turned off, the relay RL2 is also turned off, whereby the input terminal h is connected to the output terminal k. The input terminal g is connected to the terminal H of the wiper control switch 3, whereas the input terminal i is connected to the terminal L of the wiper control switch 3. The input terminal h is connected to the terminal b of the intermittent wiper relay 2, to the terminal S of the limit switch 12 and to the emitter of a transistor T3. The output terminal j is connected to the terminal H of the motor 11 of the wiper motor 1 and the output terminal k is connected to the terminal L of the motor 11. That is, the relay RL2 transmits the signal given by the wiper control switch 3 while the switch SW2 of the ignition switch is held on to the wiper motor 1 and supplies the output signal of the terminal S of the limit siwtch 12 to the terminal L of the motor 11 of the wiper motor while the switch SW2 of the ignition switch 5 is held off.

The alarm generator block (an alarm driving circuit) 30 includes a pnp transistor T3 which is turned off in response to the OFF state of the switch SW2 at the second stage of the ignition switch and turned on in response to the ON state thereof. The emitter terminal of the transistor T3 is connected to the terminal L of the limit switch 12 and its collector is connected to one input terminal of, e.g., an alarm buzzer for giving an alarm. The base of the transistor T3 is connected to the output terminal of the switch SW2 at the second stage of the ignition switch 5 through a diode D3 and a resistor R6. In other words, the alarm generator block (alaram driving circuit) 30 supplies the current to the alarm buzzer 15 and sounds it when the wiper blade is placed in the midposition of the windshield while the switch SW3 of the ignition switch 5 is hold off.

Taking the low speed operation of the motor 11 as example, the operation will subsequently be described.

Figure 7:
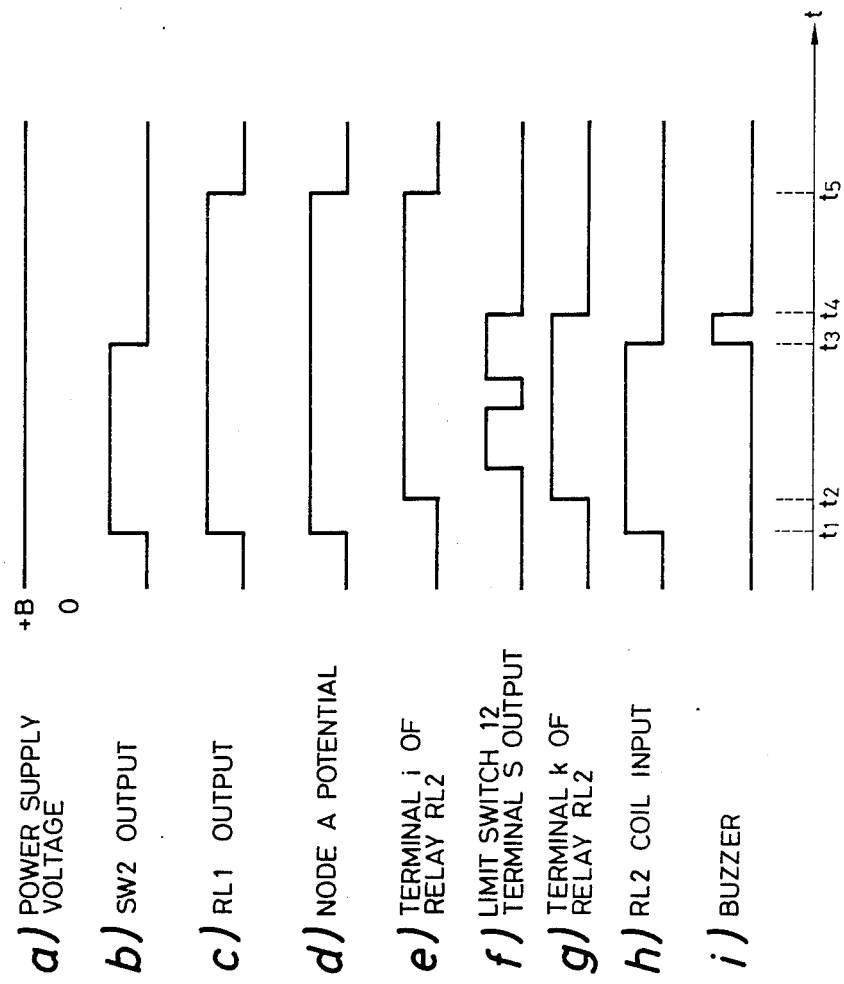
FIG. 7 shows a time chart representing the operation of the embodiment of FIG. 6.

FIG. 7 shows output signal waveforms in parts of the circuit shown in FIG. 6 when the wiper motor is operated at low speed. Referring to FIGS. 6, 7, the operation of the wiper control apparatus embodying the present invention will be described.

At time t1, the switch SW2 at the second stage of the ignition switch 5 is turned on to supply the power supply voltage to the engine system. The current is thus supplied to the base of the transistor T1 through the diode D1, the resistors R1, R2 and the transistor T1 is turned on. At this time, the capacitor C1 is simultaneously charged. Since the collector of the transistor T1 is connected to the power supply 6 with its emitter connected to the base of the transistor T2 through the resistor R4, the transistor T2 is also turned on. Accordingly, the current flowing through the coil of the relay RL1 let the relay RL1 conduct and the voltage +B from the power supply 6 is applied to the power supply system of the wiper control apparatus through the node A, whereby the wiper control apparatus becomes ready for operation. On the other hand, since the current is caused to flow through the coil of the relay RL2 through the switch SW2, the relay RL2 is also turned on and the terminals g, i are connected to the terminal j, k, respectively. In this state, the wiper control switch 3 is held off and no voltage is supplied to the input terminals g, i of the relay RL2. Moreover, since the terminal S of the limit switch 12 is connected to the terminal E, the terminal i of the relay RL2 has ground potential. Accordingly, the motor 11 is not turned.

At time T2, the wiper control switch 3 is set to LOW in order to operate the wiper blade at low speed and, when the terminals B, S are connected, the power supply voltage +B is supplied to the terminal L of the motor 11 through the relay RL2 and the motor 11 operates at low speed. Consequently, the wiper blade correspondingly operates at low speed. The terminal S of the limit switch detects the wiper blade position and connects the terminals S, E when the wiper blade is located close to the stop position or the terminals S, B when the wiper blade is placed in the midposition and sends out a position detection signal from the terminal S.

At time t3, the switch SW2 of the ignition switch is turned off when the wiper blade remains in the midposition and the engine is stoppped. Although no voltage is applied to the base of the transistor T1 through the switch SW2, the transistor T1 maintains the ON state for a predetermined time by making use of the discharge current from the capacitor C1. In consequence, the transistor T2 is also held on during that time and the relay RL1 is also correspondingly held on, whereas the power supply voltage +B is supplied to the power supply system of the wiper control apparatus and make the apparatus operational.

On the other hand, the relay RL2 remains OFF in response to the OFF state of the switch SW2 of the ignition switch 5 and the terminal k is connected the terminal h. At this time, although the voltage +B is supplied to the terminal i through the wiper control switch 3, the voltage +B thus supplied to the terminal i is not given to the terminal k because the terminal i is cut off from the terminal k. However, since the wiper blade is located in the midposition, the terminal S of the limit switch 12 has been connected to the terminal B and the voltage +B present at the terminal S is applied to the terminal k of the relay RL2, so that the voltage +B is supplied to the terminal L of the motor 11 through the terminal k. Accordingly, the motor 11 is kept operated until the wiper blade is returned to the stop position.

On the other hand, the alarm driving circuit 30 becomes operational in response to the OFF state of the switch SW2 and the transistor T3 also is kept to conduction. The voltage +B is supplied by the terminal S of the limit switch to the emitter of the transistor T3 while the wiper blade remains in the midposition and therefore the alarm buzzer 15 is vibrated during that time.

At time t4, the terminal S of the limit switch is connected to the terminal E and it is at the ground potential when the wiper blade is returned to the stop position and correspondingly the motor 11 stops, whereas the alarm buzzer 15 also stops.

At time t5, the transistors T1, T2 are turned off when the capacitor K1 of the timer 20 has completed the discharge and the relay RL1 is also turned off, whereby the supply of the operating power supply voltage to the wiper control apparatus is stopped. The driver of the vehicle is informed by the sound of the alarm buzzer 15 of the non-OFF state of the wiper switch 3 and sets the wiper control switch 3 to OFF.

No detailed description is given of the wiper control switch 3 in the INT and HI state. However, the same operation as that in the case of the LOW state is conducted because the relay RL2 is turned off when the switch SW2 of the ignition switch 5 is turned off. Even in this case, the alarm buzzer 15 is vibrated until the wiper blade is restored to the stop position and stopped alarming when the wiper blade is returned to the stop position.

Although the voltage derived from the output terminal of the switch SW2 at the second stage of the ignition switch 5 is employed to operate the relay RL2 and control the operation of the alarm driving circuit 30 in the above embodiment, the same effect can be achieved by using the voltage from the output terminal of the switch SW1 in the first stage thereof for the purpose.

Figure 8:
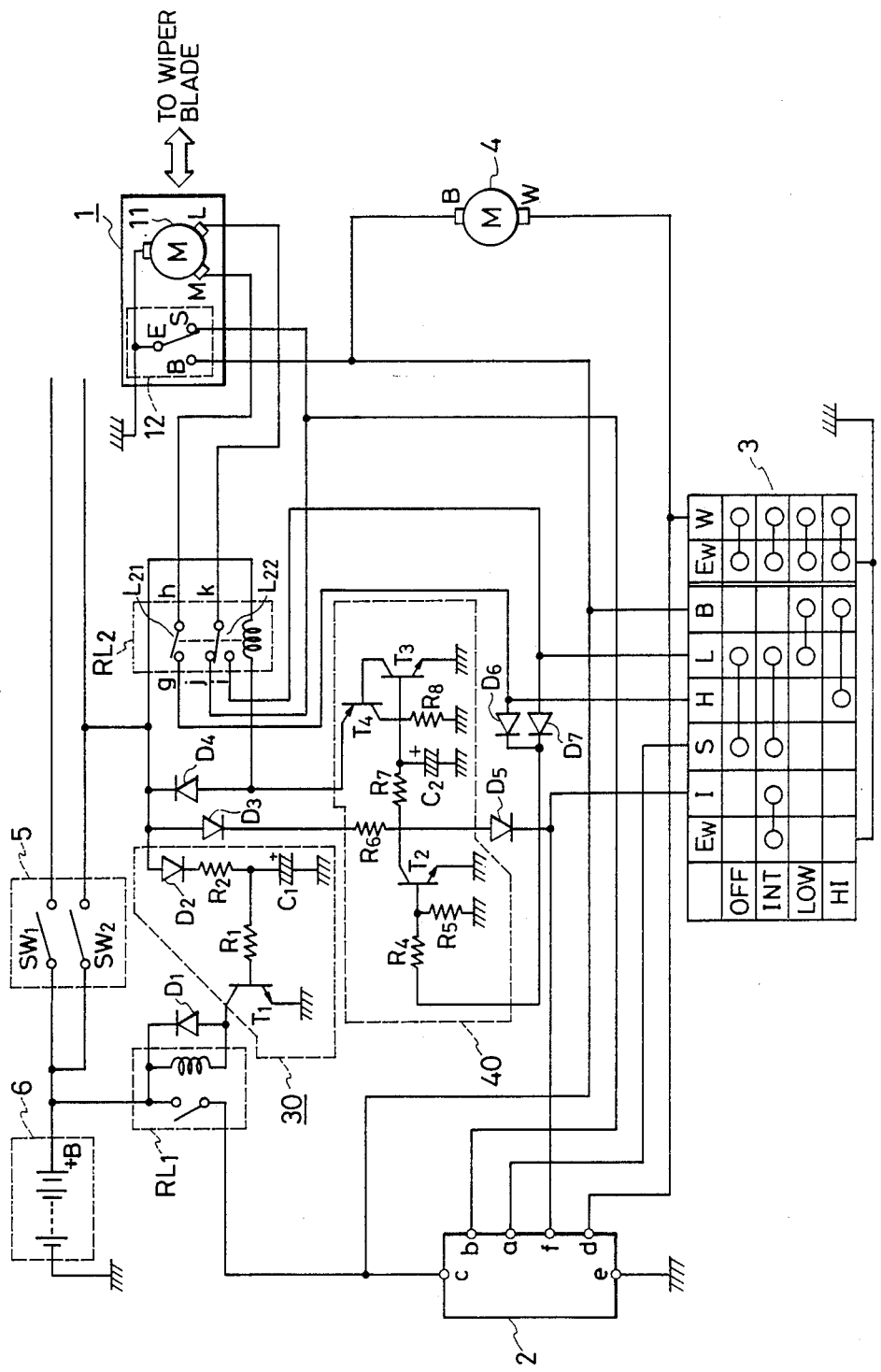
FIG. 8 shows a further cuicuit diagram embodying the present invention.

FIG. 8 shows a still another wiper control apparatus as a fourth embodiment of the present invention. In FIG. 8, like reference characters designate like or corresponding parts of the conventional wiper control apparatus of FIG. 2.

As showin in FIG. 8, the aforesaid wiper control apparatus for a vehicle as one of the embodiments of the present invention includes a relay RL1 for supplying power supply voltage +B from a power supply 6 mounted on the vehicle to the power supply system of the wiper control apparatus, a timer 30 for controlling the ON/OFF operation of the relay RL1, a relay RL2 for transmitting an operation control signal from a wiper control switch 3 to a wiper motor 1 and a relay driving circuit 40 for controlling the operation of the relay RL2.

The switch output terminal of the relay RL1 is connected to the terminal c of an intermittent wiper relay 2, to the terminal B of a limit switch 12 within the wiper motor 1, to the terminal B of the wiper control switch 3 and to the terminal B of a washer motor 4. One terminal of a coil for exciting the relay RL1 is connected to the power supply 6, the other being connected to the collector of a transistor T1 of the timer 30. A diode D1 for absorbing reverse voltage is connected in parallel to an exciting coil for the relay RL1.

The timer 30 includes an npn transistor T1 conducting in response to the the power supply voltage +B applied through a switch SW2 at the second stage of an ignition switch. The collector of the npn transistor T1 is connected to the other terminal of the exciting coil of the relay RL1 and the emitter thereof is grounded and further the base thereof is connected is the output terminal of the switch SW2 at the second stage of the ignition switch through a diode D2 and resistors R1, R2. A capacitor C1 for delaying the OFF operation of the timer 30 is connected to the resistor R2 in parallel. The delay time of the timer 30 is determined by the resistance of the resistor R1 and the capacitance of the capacitor C1.

The relay RL2 includes switches L21, L22 for exciting in response to the power supply voltage +B supplied through the switch SW2 at the second stage of the ignition switch 5. The terminal h of a relay switch 21 is connected to the terminal H of the motor 11 of the wiper motor 1, whereas the input terminal g is connected to the terminal H of the wiper control switch 3. The terminal k of a relay switch L22 is connected to the terminal L of the motor 11 and the terminal j is connected to the terminal S of the limit switch 12, to the terminal b of the intermittent wiper relay 2, whereas the terminal i is connected to the terminal L of the wiper control switch 3 and to the base of a transistor T2 through a resistor R4. A diode D4 for absorbing reverse voltage is connected to the exciting coil of the relay RL2 in parallel.

The relay driving circuit 40 includes transistors T3, T4 coupled together in a thyristor motor and a transistor T2 for controlling the operation of the transistor T3, T4. The collecting of an npn transistor T2 is connected to the output terminal of the switch SW2 through a diode D3 and a resistor R6 and to the base of the npn transistor T3 through a resistor R7. The base of the transistor T2 is connected to the terminals L, H of the wiper control switch 3 and to the terminals i, g of the relay L2 through the resistor R4 and diodes D6, D7, respectively. Further, the emitter of the transister T2 is grounded and the collector thereof is also connected to the terminal f of the intermittent wiper relay 2 and the terminal I of the wiper control switch 3.

The emitter of the npn transistor T3 is grounded and the collector thereof is connected to the base of a pnp transistor T4, whereas the base thereof is connected to the collector of the transistor T2 through the resistor R7. As for the pnp transistor T4, the emitter thereof is coupled to the other terminal of the coil of the relay RL2 and the collector thereof is connected to the base of the transistor T3. In this case, the resistors R5, R8 each are used to determined the base potential of the transistors, whereas a capacitor C2 is employed to have the transistors T3, T4 recognize the ON/OFF operation of the transistor T2 for certain and prevent the malfunction of the transistors T3, T4 coupled in a mode similar to a thyristor. The diodes D3, D5 are designed for rectification.

Figure 2:
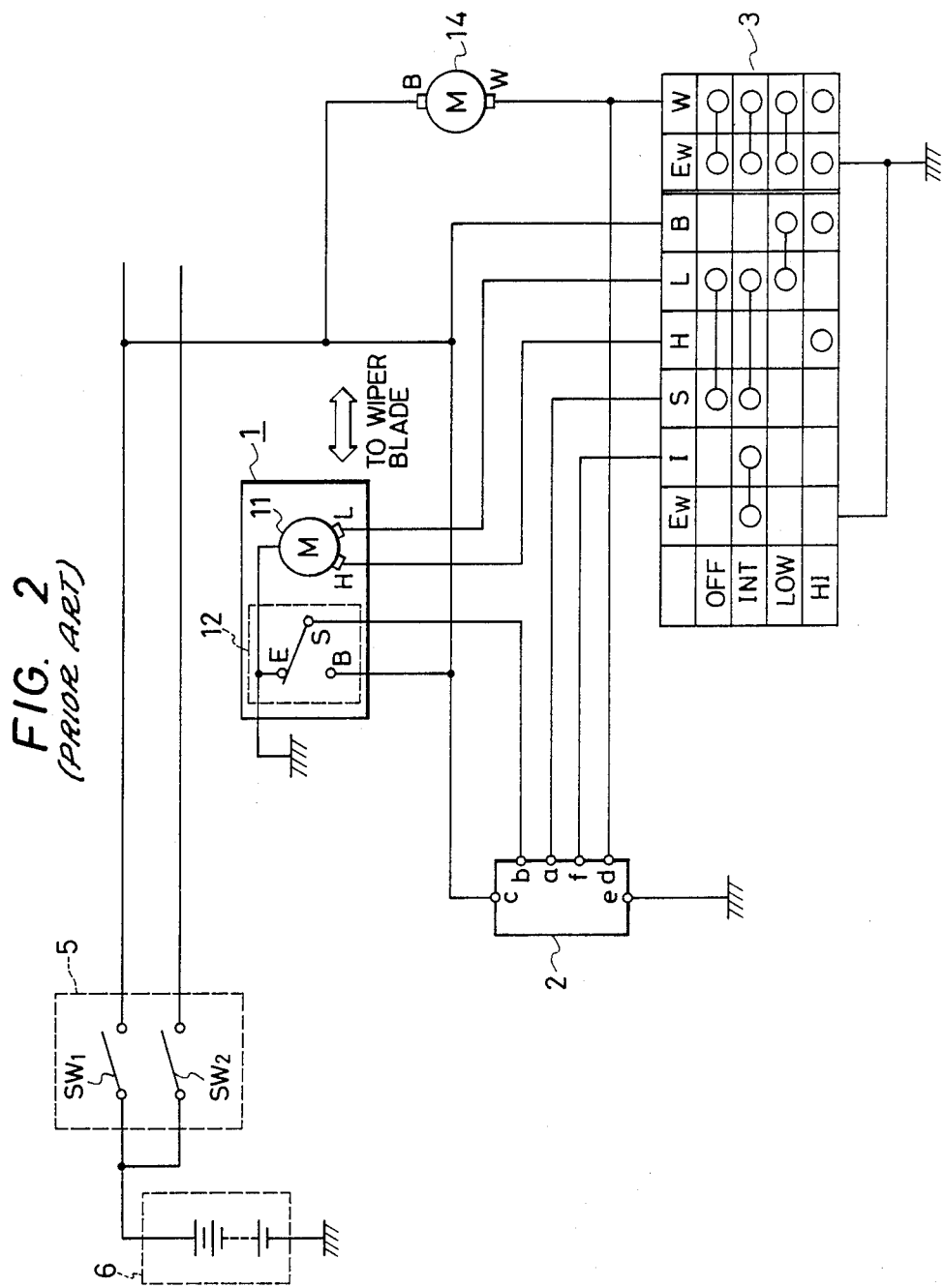
FIG. 2 shows another diagram of the construction of the conventional wiper control apparatus.

The construction and operation of the wiper motor 1, the intermittent wiper relay 2 and the wiper control switch are similar to those contained in the conventional apparatus showin in FIG. 2.

FIG. 2 shows operating waveforms in various parts when the wiper blade included in the wiper control apparatus for a vehicle as shown in FIG. 8 is operated at low speed. Referring to FIGS. 8, 9, an example of the low speed operation of the wiper blade will be described.

Prior to time t1, the wiper blade is stopped in the stop position and the terminals E, S of the limit switch 12 have been conncted. Moreover, the input of the relay RL1 is being supplied by the power supply 6 with the voltage +B. However, because the switch SW2 of the ignition switch has not yet been turned on, the transistor T1 of the timer 30 is held off and the relay RL1 is also kept off as no current flows through the coil of the relay RL1.

At time t1, the voltage +B is supplied to the output terminal of the switch SW2 when the switch SW2 of the ignition switch 5 is turned on. The voltage +B is given to the the base of the transistor T1 through the diode D2 and the resistors R2. R1 and the positive electrode of the capacitor C1, whereby the transistor T1 is turned on, whereas the capacitor C1 is charged. Consequently, the current flows through the coil of the relay RL1 and the relay RL1 is held on, with its output terminal charged with the voltage +B.

On the other hand, the ground potential output of the terminal S of the limit switch 12 is applied to the base of the transistor T2 in the relay driving circuit 40 through the intermittent wiper relay 2 and the wiper control switch 3 and the transistor T2 is held off. The terminal I of the wiper control switch 3 is in a floating state and the voltage +B is supplied by the switch SW2 of the ignition switch 5 through the diode D3 and the resistor R6 and consequently not only the transistor T3 but also the transistor T4 is kept in conduction. The current flows through the coil of the relay RL2, thus allowing the relay RL2 to conduct. The terminals g, i of the relay RL2 are then connected to the terminals h, k, respectively. It becomes thus possible to transmit an operational mode designating signal from the wiper control switch 3 to the wiper motor 1.

The output of the terminal S of the limit switch 12 is applied to the terminal L of the motor 11 through the intermittent wiper relay 2 and the wiper control switch 3 in this state. However, the output of the limit switch is at the ground potential level and the motor 11 is unoperated.

At time t2, the terminal L and the power supply terminal B of the wiper control switch are connected when it is set to LOW. The output of the terminal L of the wiper control switch 3 is applied to the terminal L of the motor 11 of the wiper motor 1 through the release switch L22 and the motor 11 starts to operate at low speed, thus causing the wiper blade to operate at low speed. Correspondingly, the connecting terminal of the terminal S of the limit switch 12 is changed from the terminal E to the terminal B in accordance with the position of the wiper blade and a signal corresponding to the position thereof is sent out from its terminal S.

On the other hand, the voltage +B from the terminal L of the wiper control switch 3 is given to the base of the transistor T2 of the relay driving circuit 40, so that the transistor T2 is held on, with its collector potential being equal to the ground potential. However, since the transistors T3, T4 respectively coupled in circuit as thyristors, they are held on once they are turned on until the switch SW2 of the ignition switch 5 is turned off and the current flows through the coil of the relay RL2 and therefore the relay RL2 is held on.

At time t3, the voltage +B is supplied by the terminal S of the limit switch 12 while the wiper blade remains in the midposition after it has operated at low speed and the voltage is supplied to the terminal j of the relay switch L22 of the relay RL2 depending on the operating position of the wiper blade.

At time t4, the terminal S of the limit switch 12 is connected to the terminal E after the wiper blade is returned to the stop position and a signal at the gound potential level is applied to the terminal j of the relay switch L22.

At time t5, the switch SW2 of the ignition switch 5 is turned off to stop the engine while the wiper blade is located in the mid-position, the relay RL2 is turned off and the terminals j, k of the relay switch L22 are connected. Further, the transistors T3, T4 are also turned off.

On the other hand, as the base current is supplied to the base of the transistor T1 of the timer 30 because of the charge current supplied by the capacitor C1 through the resistor R1, the transistor T1 is held on and therefore the relay RL1 also maintains the ON state. While the relay RL1 is held on, the wiper control apparatus is allowed to operate. In this state, although the voltage +B is applied to the terminal i of the relay switch of the relay RL2 through the terminal L of the wiper control switch 3, the relay RL2 is held off and the voltage +B at the terminal i is not applied to the terminal k. Since the wiper blade remains in the midposition, the terminals S, B of the limit switch 12 have been connected and the voltage +B is supplied by the terminal S of the limit switch 12 to the terminal L of the motor 11 of the wiper motor 1 through the terminals j, k of the relay switch L22, so that the motor 11 keeps turning.

At time t6, the terminals S, E of the limit switch 12 are connected and the potential drops to the ground potential level when the wiper blade is returned to the stop positions. Correspondingly, the terminal L of the motor 11 is caused to have the ground potential through the relay switch L22 and the motor 11 stops.

At time t7, the transistor T1 is turned off when the delay operation of the timer 30 is completed after the capacitor C1 is completed discharged and the relay RL1 is also turned off, whereby no power supply voltage is supplied to the power supply system of the wiper control apparatus.

At time t8, the switch SW2 of the ignition switch is caused to conduct. The transistor T1 of the timer 30 is correspondingly turned on and the relay RL1 is also turned on, so that the power supply voltage +B is applied to the power supply system of the wiper control apparatus. At this time, the voltage +B is supplied to the terminal i of the relay switch L22. through the wiper control switch 3 and to the base of the transistor T2 and the transistor T2 is turned on. Consequently, the base potential of the transistor T3 drops to the ground potential and therefore the transistors T3, T4 are held off, whereas no current is caused to flow through the coil of the relay RL2, whereby the relay RL2 is held off. The terminals j, k of the relay switch L22 are connected in that state and the output of the terminal S of the limit switch 12 is applied to the terminal L of the motor 11. However, the potential of the terminal S of the limit switch 12 remains at the ground potential and the motor 11 is not operated.

At time t9, the ground potential is given to the base of the transistor T2 through the limit switch 12, the intermittent wiper relay 2 and the wiper control switch 3 when the vehicle driver turns the wiper control switch 3 off on noticing the wiper control switch 3 is held on and the transistor T2 is turned off. Then the transistors T3, T4 are turned on and the relay RL2 is also turned on, so that the terminals i, k of the relay switch L22 are connected.

At time t10, the transistor T2 is turned on when the wiper control switch 3 is set to LOW and the power supply voltage +B is applied to the terminal i of the relay RL 2. At this time, because the transistors T3, T4 have been held on, those transistors are held on until the switch SW2 of the ignition switch 5 is turned off. Since the relay RL2 are held on, the power supply voltage +B given to the terminal i of the relay switch L22 is supplied to the terminal L of the motor 11 athrough the terminal k and accordingly the motor is operated at low speed.

At time t11, the wiper blade performs operation corresponding to the revolution of the motor 11 and, when it reaches the midposition, the terminal S of the limit switch 12 outputs and supplies the voltage +B to the terminal j of the relay switch L2. Thereafter, the wiper blade keeps performing the low speed operation until the wiper control switch 3 is turned off.

Although a description has been given of the operation of setting the wiper control switch from LOW to OFF at time t9, the same operation is applicable to setting the aforesaid switch from LOW to INT and to HI. When the LOW state is switched to HI state at time t9, the relay RL2 is held off and the terminals g, h of the relay switch are not connected, whereby the voltage +B is not supplied to the terminal H of the motor 11.

With respect to the intermittent operation, the terminal I of the wiper control switch 3 is connected through a grounding line Ew and the transistors T3, T4 are kept off and the relay RL2 is also turned off. In consequence, the voltage +B is not supplied to the terminal L of the motor 11 and the motor is therefore not operated.

Although reference has been made to the low speed operation of the motor 11 in the foresaid embodiments, similar consideration may be given to the high speed operation of the motor 11 (in this case, controlled by the relay switch L21 in operation) and the intermittent operation thereof.

Moreover, it has been so arranged in the aforesaid embodiments that the power supply voltage for exciting the coil of the relay RL2 is supplied through the switch SW2 at the second stage of the ignition switch. However, the same effect is achievable by supplying the voltage through the switch SW1 at the first stage of the ignition switch 5.

As set forth above in concrete terms, the wiper blade is prevented from stopping in the midposition of windshield but made to stop in the predetermined lower position thereof even though the ignition switch is turned off while the wiper switch is held on and the present invention thus offers a great convenience to vehicle drivers.

According to the present invention, moreover, the wiper motor is caused to operate until the wiper blade is returned to the stop position even if the ignition switch is turned off while the wiper blade remains in the midposition of a windshield and the alarm buzzer is vibrated so as to warn the driver during that time, so that he is prevented from forgetting to turn off the wiper control switch (to set it to OFF). As it is unnessary to return the wiper blade to the stop position, the operability of the wiper control switch, in case the driver has forgotten to turn it off, can be improved. Furthermore, power consumption in the wiper driving system can be substantially nullified provided the wiper blade is stopped after the ignition switch is turned off.

According to the present invention, further, the wiper motor is operated until the wiper blade is restored to the stop position even if the engine is stopped by turning off the ignition switch while the wiper blade is in operation and, in that state, the wiper motor is not allowed to operate after the wiper control switch is turned off once even though the ignition switch is turned on again. In consequence, no troublesome procedure for restoring the wiper blade to the stop position is required even if the driver comes to notice that he has turned off the ignition switch while the wiper control switch is held on. Moreover, since the wiper blade is not operated at the time the ignition switch is turned on, the windshield is prevented from being damaged by dust and the like sticking thereto.

What is claimed is:

1. A wiper apparatus comprising:
   a battery;
   an ignition switch connected to said battery;
   a wiper having a wiper blade;
   a wiper switch having an output terminal, a battery terminal and a stop terminal in which said output terminal is connected to said battery terminal in a closed state and is connected to said stop terminal in an open state;
   a wiper driving means having a wiper motor which receives power through said output terminal of said wiper switch from said battery for driving said wiper, and a cam switch having a voltage terminal for receiving power from said battery, a ground terminal, and a movable contact connected to said stop terminal of said wiper switch, said movable contact is connected to said ground terminal while said wiper blade stays in a predetermined position and is connected to said voltage terminal while said wiper blade stays in a position other than said predetermined position;
   wiper auto-off means comprising a switch means, first and second diode means, and an ON/OFF decision means, in which said switch means, in an ON state for passing current supplied from said battery, not via said ignition switch, to the voltage terminal of said cam switch and to the battery terminal of said wiper switch, and for cutting off the current in an OFF state; said first diode means for allowing the current passed through said ignition switch from said battery to flow therein; said second diode means for allowing the current passed through said voltage terminal and said movable contact of said cam switch to flow therein; and said ON/OFF decision means for placing said switch means in said ON state provided that said wiper switch is in said open state and that said ignition switch is turned on to thereby causing the current to flow through said first diode means from said ignition switch and thereafter for holding said switch means in the ON state provided that the current is caused to flow from one of said first and second diode means, moreover for turning off said switch means provided that said ignition switch is turned off to stop the flow of the current from said first diode means and that the movable contact of said cam switch is separated from the voltage terminal to stop the flow of current from said second diode means.

2. A wiper apparatus as claimed in claim 1, wherein said switch means comprises a relay circuit.

3. A wiper apparatus as claimed in claim 1, wherein said ON/OFF decision means comprises an open-type relay circuit.

4. A wiper control apparatus for controlling the operation of a wiper blade for use in a motor vehicle on receiving voltage supplied by a power supply mounted on the vehicle, said wiper blade being provided with a predetermined stop position and midway positions other than said predetermined position, said wiper control apparatus comprising:

first switch means, in a conductive state thereof, for passing the voltage received from said power supply to make said wiper control apparatus operable;

second switch means, in a conductive state thereof, for passing the voltage received from said power supply to make said vehicle operable;

control means for controlling the ON/OFF operation of said first switch means, said control means operating in response to the conductive state of said second switch means to render said first switch means conductive and not operating after the passage of a predetermined time in response to a cut-off state of said second switch means to render said first switch means nonconductive;

instruction signal generating means which is operable on receiving the voltage from said first switch means to generate an instruction signal for designating operating modes of said wiper blade;

position detecting means for detecting the position of said wiper blade to generate a detecting signal corresponding to one of said stop position and said midway positions;

selection means for receiving said detecting signal and said instruction signal to pass said detecting signal in response to the cut-off state of said second switch means and to pass said instruction signal in response to the conductive state of said second switch means;

wiper drive means for driving said wiper blade in response to the instruction signal from said selection means; and alarm generating means which is operable in response to the cut-off state of said second switch means for generating an alarm signal in response to said detecting signal produced by said position detecting means corresponding to said midway positions.

5. A wiper control apparatus for controlling the operation of a wiper blade for use in a motor vehicle on receiving voltage supplied by a power supply mounted on the vehicle, said wiper blade being provided with a predetermined stop position and midway positions other than said predetermined position, said wiper control apparatus comprising:

first switch means, in a conductive state, for passing the voltage received from said power supply to make said wiper control apparatus operable;

second switch means for operating in response to the conductive state of said first switch means and not operating after the passage of a predetermined time in response to a cut-off state of said first switch means, to pass the voltage from said power supply to make said wiper control apparatus operable;

instruction signal generating means for generating an instruction signal which designates an operation mode of said wiper blade;

position detecting means for detecting a position of said wiper blade to generate a detecting signal which designates one of said stop and midway positions;

selection means for receiving said detecting signal and said instruction signal to selectively output one of said detecting and instruction signals;

wiper drive means for driving said wiper blade in response to the signal outputted by said selection means;

control means which is operable in response to the conductive state of said first switch means, for controlling the selective operation of said selection means in response to said instruction signal of said instruction signal generating means, wherein said selection means applies said detecting signal to said wiper drive means when receiving a wiper blade stop signal as said instruction signal from said instruction signal generating means during operational state of said control means, and when receiving a wiper blade operation signal during non-operational state but thereafter becoming operational state thereof;

said predetermined time of said second switch means being set longer than the time required for said wiper blade to travel back to said predetermined stop position.

* * * * *